United States Patent
Ishio et al.

(10) Patent No.: US 6,744,258 B2
(45) Date of Patent: Jun. 1, 2004

(54) CAPACITIVE SENSOR APPARATUS

(75) Inventors: Seiichiro Ishio, Kariya (JP); Yasutoshi Suzuki, Okazaki (JP); Hajime Ito, Ichinomiya (JP); Yasuaki Makino, Oakazaki (JP); Norikazu Ohta, Aichi-ken (JP); Keiichi Shimaoka, Aichi-ken (JP); Hirofumi Funabashi, Aichi-ken (JP)

(73) Assignee: Denso Corporation, Kariya (JP)

( * ) Notice: Subject to any disclaimer, the term of this patent is extended or adjusted under 35 U.S.C. 154(b) by 23 days.

(21) Appl. No.: 10/189,565

(22) Filed: Jul. 8, 2002

(65) Prior Publication Data

US 2003/0011378 A1 Jan. 16, 2003

(30) Foreign Application Priority Data

Jul. 11, 2001 (JP) ........................................ 2001-211099

(51) Int. Cl.[7] .......................... G01R 31/12; G01R 27/26
(52) U.S. Cl. ....................................... 324/548; 324/658
(58) Field of Search ................................ 324/548, 658, 324/660, 71.1, 661, 378, 403, 415, 425, 500, 537; 327/95, 554; 361/118; 73/718

(56) References Cited

U.S. PATENT DOCUMENTS

| 4,439,693 | A | * | 3/1984 | Lucas et al. | .................. | 327/95 |
| 4,838,088 | A |   | 6/1989 | Murakami | | |
| 5,028,876 | A | * | 7/1991 | Cadwell | ..................... | 324/678 |
| 5,277,068 | A |   | 1/1994 | Fukiura et al. | | |
| 5,659,254 | A | * | 8/1997 | Matsumoto et al. | ........ | 324/678 |
| 5,986,497 | A | * | 11/1999 | Tsugai | ........................ | 327/554 |
| 6,029,524 | A | * | 2/2000 | Klauder et al. | ................ | 73/718 |
| 6,618,235 | B1 | * | 9/2003 | Wagoner et al. | ............ | 361/118 |

FOREIGN PATENT DOCUMENTS

| DE | 19652325 C1 | * | 5/1998 | ........... H01L/27/08 |
| JP | 4-143628 | | 5/1992 | |
| JP | 7-50789 | | 5/1995 | |
| JP | 9-257618 | | 10/1997 | |
| JP | 2000-199726 | | 7/2000 | |
| JP | 2000-214035 | | 8/2000 | |
| JP | 2000-258272 | | 9/2000 | |

* cited by examiner

Primary Examiner—Andrew H. Hirshfeld
Assistant Examiner—Hoai-An D. Nguyen
(74) Attorney, Agent, or Firm—Posz & Bethards, PLC

(57) ABSTRACT

In a capacitive sensor apparatus, a capacitive sensor includes a plurality of physical-quantity-detection capacitors each having a movable electrode and a fixed electrode. A conversion device operates for converting an output signal of the capacitive sensor into an apparatus output signal. Each of the physical-quantity-detection capacitors is selectively connected and disconnected to and from the conversion device. A determination is made as to whether or not each of the physical-quantity-detection capacitors fails in response to the sensor output signal. When it is determined that a first one of the physical-quantity-detection capacitors fails, the first one is disconnected from the conversion device and a second one of the physical-quantity-detection capacitors is connected to the conversion device.

10 Claims, 8 Drawing Sheets

CAPACITIVE SENSOR APPARATUS

BACKGROUND OF THE INVENTION

1. Field of the Invention

This invention relates to a capacitive-type sensor apparatus for detecting a physical quantity.

2. Description of the Related Art

A typical capacitive sensor apparatus includes a capacitor designed so that its capacitance will depend on a physical quantity to be detected. The typical capacitive sensor apparatus further includes a circuit for detecting the capacitance of the capacitor. The detected capacitance indicates the physical quantity.

Some capacitive sensor apparatuses are of integrated structures. In such an apparatus, when a capacitor therein fails, it is difficult to replace it with new one.

SUMMARY OF THE INVENTION

It is an object of this invention to provide a fault-tolerant capacitive sensor apparatus, that is, a capacitive sensor apparatus which can implement failure compensation.

A first aspect of this invention provides a capacitive sensor apparatus comprising a capacitive sensor including a plurality of physical-quantity-detection capacitors each having a movable electrode and a fixed electrode; a conversion device for converting an output signal of the capacitive sensor into an apparatus output signal; first means for selectively connecting and disconnecting each of the physical-quantity-detection capacitors to and from the conversion device; second means for determining whether or not each of the physical-quantity-detection capacitors fails in response to the sensor output signal; and third means for, when the second means determines that first one of the physical-quantity-detection capacitors fails, disconnecting the first one from the conversion device and connecting second one of the physical-quantity-detection capacitors to the conversion device.

A second aspect of this invention is based on the first aspect thereof, and provides a capacitive sensor apparatus further comprising a diagnosis device for determining whether the apparatus output signal is normal or abnormal, and means for, when the diagnosis device determines that the apparatus output signal is abnormal, disconnecting currently-connected one of the physical-quantity-detection capacitors from the conversion device and connecting another of the physical-quantity-detection capacitors to the conversion device.

A third aspect of this invention is based on the first aspect thereof, and provides a capacitive sensor apparatus wherein the conversion device includes means for changing a characteristic of the conversion of the output signal of the capacitive sensor into the apparatus output signal in accordance with which of the physical-quantity-detection capacitors is connected to the conversion device to make the apparatus output signal independent of which of the physical-quantity-detection capacitors is connected to the conversion device.

A fourth aspect of this invention is based on the third aspect thereof, and provides a capacitive sensor apparatus wherein the means in the conversion device changes a gain of the conversion of the output signal of the capacitive sensor into the apparatus output signal in accordance with which of the physical-quantity-detection capacitors is connected to the conversion device.

A fifth aspect of this invention is based on the first aspect thereof, and provides a capacitive sensor apparatus further comprising means for applying a detection-purpose voltage to the capacitive sensor, and means for changing the applied detection-purpose voltage in accordance with which of the physical-quantity-detection capacitors is connected to the conversion device to make the apparatus output signal independent of which of the physical-quantity-detection capacitors is connected to the conversion device.

A sixth aspect of this invention provides a capacitive sensor apparatus comprising first and second capacitors having capacitances depending on a physical quantity to be detected; first means for detecting the physical quantity in response to the capacitance of the first capacitor; second means for determining whether or not the first capacitor fails; and third means for, in cases where the second means determines that the first capacitor fails, detecting the physical quantity in response to the capacitance of the second capacitor.

DETAILED DESCRIPTION OF THE INVENTION

A prior-art capacitive sensor apparatus will be explained below for a better understanding of this invention.

Figure 1:
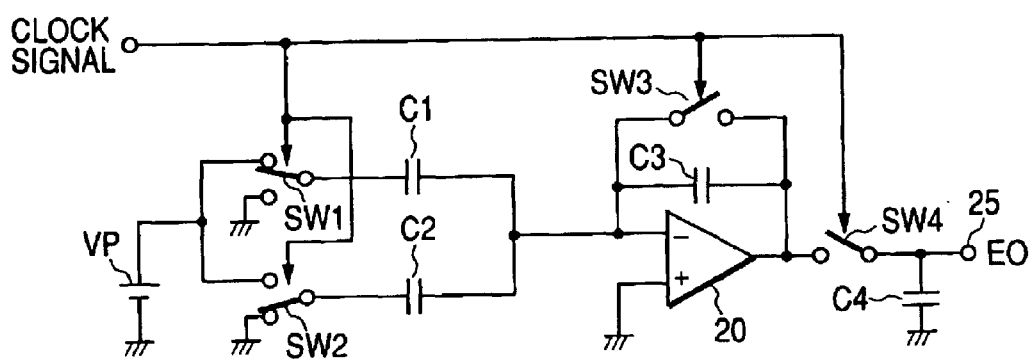
FIG. 1 is a diagram of a prior-art capacitive sensor apparatus.

FIG. 1 shows a prior-art capacitive sensor apparatus disclosed in Japanese patent application publication number P2000-214035A. The prior-art apparatus of FIG. 1 includes a detection capacitor C1 and a reference capacitor C2.

The detection capacitor C1 has a pair of a movable electrode and a fixed electrode. The movable electrode is displaced relative to the fixed electrode in response to a physical quantity to be detected. Therefore, the capacitance of the detection capacitor C1 depends on the physical quantity. The reference capacitor C2 has a pair of fixed electrodes. Accordingly, the capacitance of the reference capacitor C2 remains constant independently of the physical quantity. Thus, the difference in capacitance between the detection capacitor C1 and the reference capacitor C2 varies as a function of the physical quantity.

In the prior-art apparatus of FIG. 1, a switch SW1 is connected among first one of the two electrodes in the detection capacitor C1, the positive terminal of a dc power supply VP, and a ground. The switch SW1 functions to apply either the positive potential of the dc power supply VP or the ground potential to the first electrode in the detection capacitor C1. The negative terminal of the dc power supply VP is grounded. A switch SW2 is connected among first one of the two electrodes in the reference capacitor C2, the positive terminal of the dc power supply VP, and the ground. The switch SW2 functions to apply either the positive potential of the dc power supply VP or the ground potential to the first electrode in the reference capacitor C2.

The second electrode in the detection capacitor C1 and the second electrode in the reference capacitor C2 are connected in common to the inverting input terminal of an operational amplifier 20. The non-inverting input terminal of the operational amplifier 20 is grounded. A feedback capacitor C3 is connected between the output terminal and the inverting input terminal of the operational amplifier 20. A switch SW3 is connected across the feedback capacitor C3. A switch SW4 is connected between an apparatus output terminal 25 and the output terminal of the operational amplifier 20. A smoothing capacitor C4 is connected between the apparatus output terminal 25 and the ground.

The switches SW1, SW2, SW3, and SW4 are controlled by a common clock signal having a prescribed frequency. The clock signal periodically changes between two different voltage states so that operation of the prior-art apparatus of FIG. 1 alternates between first and second modes.

During the first mode of operation, the switch SW1 applies the positive potential of the dc power supply VP to the first electrode in the detection capacitor C1 while the switch SW2 applies the ground potential to the first electrode in the reference capacitor C2. The switch SW3 is in its on state (its closed state) while the switch SW4 is in its off state (its open state).

During the second mode of operation, the switch SW1 applies the ground potential to the first electrode in the detection capacitor C1 while the switch SW2 applies the positive potential of the dc power supply VP to the first electrode in the reference capacitor C2. The switch SW3 is in its off state (its open state) while the switch SW4 is in its on state (its closed state).

The voltage EO at the apparatus output terminal 25 depends on the difference in capacitance between the detection capacitor C1 and the reference capacitor C2. Accordingly, the voltage EO indicates the physical quantity to be detected.

In the prior-art apparatus of FIG. 1, the detection capacitor C1 and the reference capacitor C2 are of an integrated structure having a common substrate. Therefore, in the event that one of the detection capacitor C1 and the reference capacitor C2 fails, it is difficult to replace it with new one. In that case, it is necessary to replace the whole of the integrated structure.

First Embodiment

Figure 2:
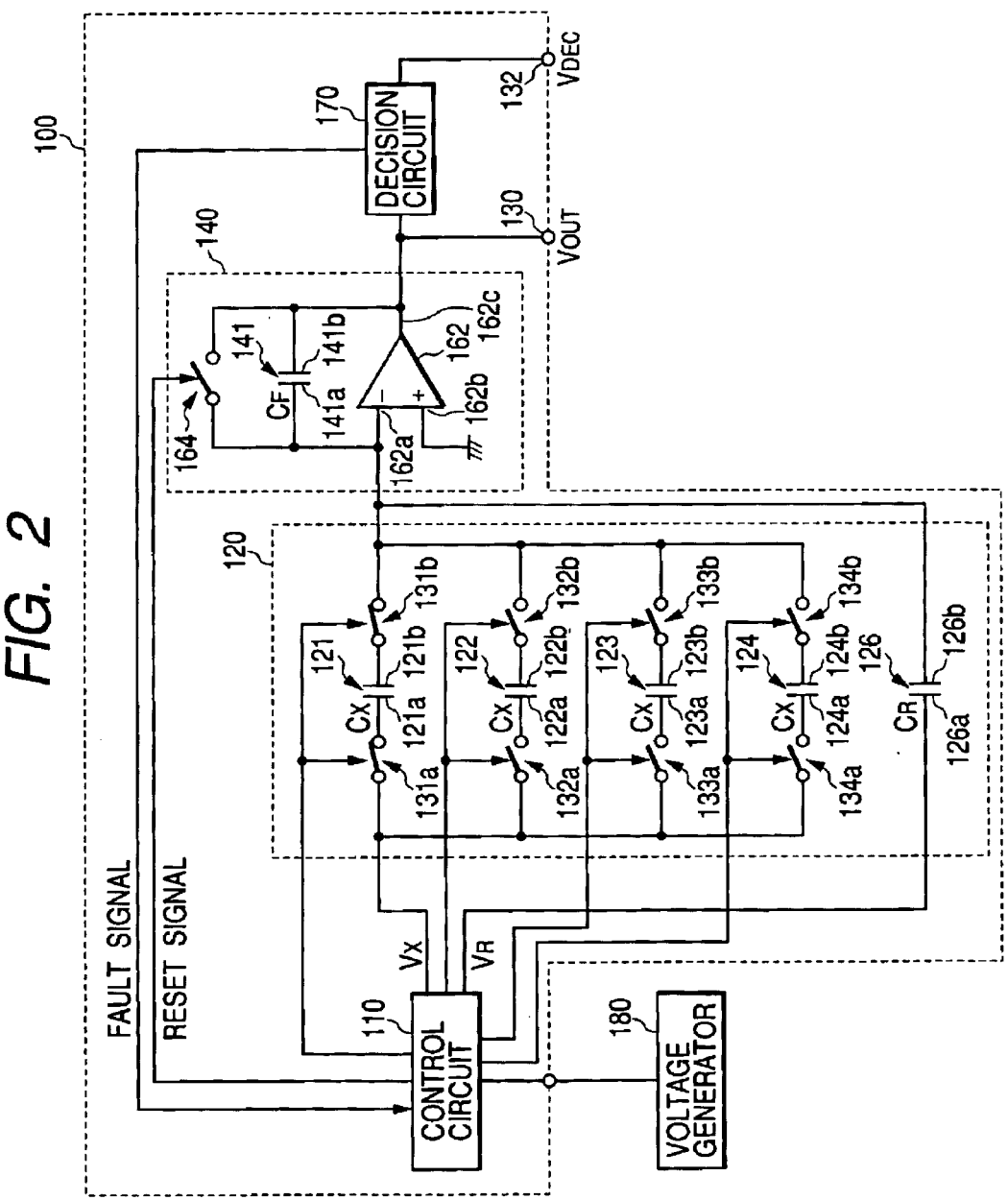
FIG. 2 is a diagram of a capacitive sensor apparatus according to a first embodiment of this invention.

FIG. 2 shows a capacitive sensor apparatus 100 according to a first embodiment of this invention. As shown in FIG. 2, the apparatus 100 includes a control circuit 110, a capacitive sensor 120, a conversion circuit 140, and a decision circuit 170. The control circuit 110 is connected with a voltage generator 180 external with respect to the apparatus 100. The control circuit 110 is supplied with a dc voltage from the voltage generator 180.

The capacitive sensor 120 includes detection capacitors 121, 122, 123, and 124, switches 131a, 132a, 133a, and 134a, switches 131b, 132b, 133b, and 134b, and a reference capacitor 126. The detection capacitors 121–124 are equal in structure. The capacitances of the detection capacitors 121–124 depend on a physical quantity to be detected. The dependencies of the capacitances of the detection capacitors 121–124 on the physical quantity are equal. Examples of the physical quantity are a pressure, an acceleration, and an angular velocity.

The detection capacitor 121 has a pair of a fixed electrode 121a and a movable electrode 121b exposed to the physical quantity to be detected. The movable electrode 121b is displaced relative to the fixed electrode 121a in response to the physical quantity. Thus, the capacitance of the detection capacitor 121 depends on the physical quantity.

The detection capacitor 122 has a pair of a fixed electrode 122a and a movable electrode 122b exposed to the physical quantity to be detected. The movable electrode 122b is displaced relative to the fixed electrode 122a in response to the physical quantity. Thus, the capacitance of the detection capacitor 122 depends on the physical quantity.

The detection capacitor 123 has a pair of a fixed electrode 123a and a movable electrode 123b exposed to the physical quantity to be detected. The movable electrode 123b is displaced relative to the fixed electrode 123a in response to the physical quantity. Thus, the capacitance of the detection capacitor 123 depends on the physical quantity.

The detection capacitor 124 has a pair of a fixed electrode 124a and a movable electrode 124b exposed to the physical quantity to be detected. The movable electrode 124b is displaced relative to the fixed electrode 124a in response to the physical quantity. Thus, the capacitance of the detection capacitor 124 depends on the physical quantity.

The movable electrodes 121b–124b are formed on a diaphragm or diaphragms deforming in response to the physical quantity to be detected. Alternatively, the movable electrodes 121b–124b may be formed on a mass or masses displaced in response to the physical quantity to be detected. For example, the mass or masses are connected with a beam or beams deforming in response to the physical quantity.

The reference capacitor 126 has a pair of a lower fixed electrode 126a and an upper fixed electrode 126b opposing each other. Basically, the capacitance of the reference capacitor 126 remains constant independently of the physical quantity to be detected.

The movable electrodes 121b–124b in the detection capacitors 121–124 are designed as upper electrodes while the fixed electrodes 121a–124a therein are designed as lower electrodes opposing the upper electrodes. According to a first exemplary capacitor arrangement, the upper electrodes 121b–124b in the detection capacitors 121–124 are formed on a central portion of a diaphragm which can easily deform. On the other hand, the upper electrode 126b in the reference capacitor 126 is formed on an edge portion of the diaphragm which hardly deforms. According to a second exemplary capacitor arrangement, the upper electrodes 121b–124b in the detection capacitors 121–124 are formed on a diaphragm while the upper electrode 126b in the reference capacitor 126 is located at a stationary area outside the diaphragm.

The lower electrodes 121a–124a in the detection capacitors 121–124 are connected to the control circuit 110 via the switches 131a–134a respectively. The upper electrodes 121b–124b in the detection capacitors 121–124 are connected to the conversion circuit 140 via the switches 131b–134b respectively. The lower electrode 126a in the reference capacitor 126 is directly connected to the control circuit 110. The upper electrode 126b in the reference capacitor 126 is directly connected to the conversion circuit 140.

The control circuit 110 includes a microcomputer or a similar device having a combination of an input/output circuit, a CPU, a ROM, and a RAM. The control circuit 110 operates in accordance with a program stored in the ROM. The program is designed to enable the control circuit 110 to execute operation steps mentioned hereafter.

The control circuit 110 generates a detection-purpose voltage VX and a reference voltage VR on the basis of the dc voltage supplied from the voltage generator 180. The detection-purpose voltage VX is applied to one of the lower electrodes 121a–124a in the detection capacitors 121–124 via related one of the switches 131a–134a. The reference voltage VR is applied to the lower electrode 126a in the reference capacitor 126.

The switches 131a and 131b have control terminals which are connected in common to the control circuit 110. The switches 132a and 132b have control terminals which are connected in common to the control circuit 110. The switches 133a and 133b have control terminals which are connected in common to the control circuit 110. The switches 134a and 134b have control terminals which are connected in common to the control circuit 110. The switches 131a–134a and 131b–134b are controlled by the control circuit 110. Specifically, each of the switches 131a–134a and 131b–134b is changed between its on state and its off state (its closed state and its open state) by the control circuit 110.

The control circuit 110 is connected with the conversion circuit 140. The control circuit 110 generates a reset signal on the basis of the dc voltage supplied from the voltage generator 180. The reset signal is transmitted from the control circuit 110 to the conversion circuit 140. The reset signal can change between a high-level state and a low-level state.

The control circuit 110 is connected with the decision circuit 170. The control circuit 110 can receive a high-level fault-indication signal VDEC from the decision circuit 170. The control circuit 110 changes the switches 131a–134a and 131b–134b in response to the received high-level fault-indication signal VDEC.

The conversion circuit 140 includes an operational amplifier 162, a reset switch 164, and a feedback capacitor 141. The upper electrodes 121b–124b in the detection capacitors 121–124 lead to the inverting input terminal 162a of the operational amplifier 162 via the switches 131b–134b respectively. The upper electrode 126b in the reference capacitor 126 is directly connected to the inverting input terminal 162a of the operational amplifier 162. The reset switch 164 and the feedback capacitor 141 are connected between the inverting input terminal 162a of the operational amplifier 162 and the output terminal 162c thereof. The non-inverting input terminal 162b of the operational amplifier 162 is grounded. The non-inverting input terminal 162b of the operational amplifier 162 may be connected to a 0-volt line.

The reset switch 164 in the conversion circuit 140 has a control terminal connected with the control circuit 110. The control terminal of the reset switch 164 receives the reset signal from the control circuit 110. The reset switch 164 changes to its on state (its closed state) when the reset signal changes to its high-level state. The feedback capacitor 141 is short-circuited and hence1 the voltage across the feedback capacitor 141 is reset to 0 volts when the reset switch 164 is in its on state. The reset switch 164 falls into its off state (its open state) when the reset signal changes to its low-level state.

As will be made clear later, one of the detection capacitors 121–124 is selected and actually used for the detection of the physical quantity. An electric signal depending on the capacitance of the actually-used detection capacitor is propagated to the conversion circuit 140. The operational amplifier 162 in the conversion circuit 140 outputs a voltage VOUT which depends on the capacitance of the actually-used detection capacitor, and hence which indicates the physical quantity to be detected.

The decision circuit 170 has an input terminal connected with the output terminal 162c of the operational amplifier 162 in the conversion circuit 140. The decision circuit 170 receives the conversion-circuit output voltage VOUT, that is, the output voltage VOUT from the operational amplifier 162. The decision circuit 170 determines whether or not the conversion-circuit output voltage VOUT is within a prescribed range corresponding to a normal range. When the conversion-circuit output voltage VOUT is not within the prescribed range, the decision circuit 170 outputs the high-level fault-indication signal VDEC. When the conversion-circuit output voltage VOUT is within the prescribed range, the decision circuit 170 does not output the high-level fault-indication signal VDEC. The high-level fault-indication signal VDEC is fed to the control circuit 110.

For example, the decision circuit 170 includes first and second comparators, and a gate such as an OR gate or an AND gate. The first comparator functions to compare the conversion-circuit output voltage VOUT with a lower threshold voltage VTH1. The second comparator functions to compare the conversion-circuit output voltage VOUT with an upper threshold voltage VTH2. The lower threshold voltage VTH1 and the upper threshold voltage VTH2 define the prescribed range. The gate can generate the high-level fault-indication signal VDEC in response to comparison-result signals outputted from the first and second comparators.

It should be noted that the decision circuit 170 may be external with respect to the apparatus 100.

The apparatus 100 has output terminals 130 and 132 for the conversion-circuit output voltage VOUT and the high-level fault-indication signal VDEC respectively. The apparatus output terminal 130 is connected to the output terminal 162c of the operational amplifier 162 to receive the conversion-circuit output voltage VOUT. The apparatus output terminal 132 is connected to the decision circuit 170 to receive the high-level fault-indication signal VDEC. In the case where a voltage waveform display such as an oscilloscope is connected with the output terminals 130, it is possible to observe variations in the conversion-circuit output voltage VOUT and the high-level fault-indication signal VDEC in time domain.

The apparatus 100 includes an operation unit, and first and second voltage generators. The first and second voltage generators are connected between the operation unit and the decision circuit 170. The first voltage generator produces the lower threshold voltage VTH1 which is used by the decision circuit 170. The lower threshold voltage VTH1 can be adjusted by actuating the operation unit. The second voltage generator produces the upper threshold voltage VTH2 which is used by the decision circuit 170. The upper threshold voltage VTH2 can be adjusted by actuating the operation unit.

The apparatus 100 is operated in a diagnosis mode before the shipment thereof or during the actual use thereof. As previously mentioned, the control circuit 110 operates in accordance with a program. The program has a diagnosis-related segment. The diagnosis-related program segment is designed to enable the control circuit 110 to implement the following sequence of operation steps.

Initially, the control circuit 110 sets the switches 131*a* and 131*b* in their on states, and sets the switches 132*a*–134*a* and 132*b*–134*b* in their off states. Therefore, the detection capacitor 121 is selected among the detection capacitors 121–124 as actually-used one connected with the control circuit 110 and the conversion circuit 140. On the other hand, the other detection capacitors 122–124 are disconnected from the control circuit 110 and the conversion circuit 140.

Figure 3:
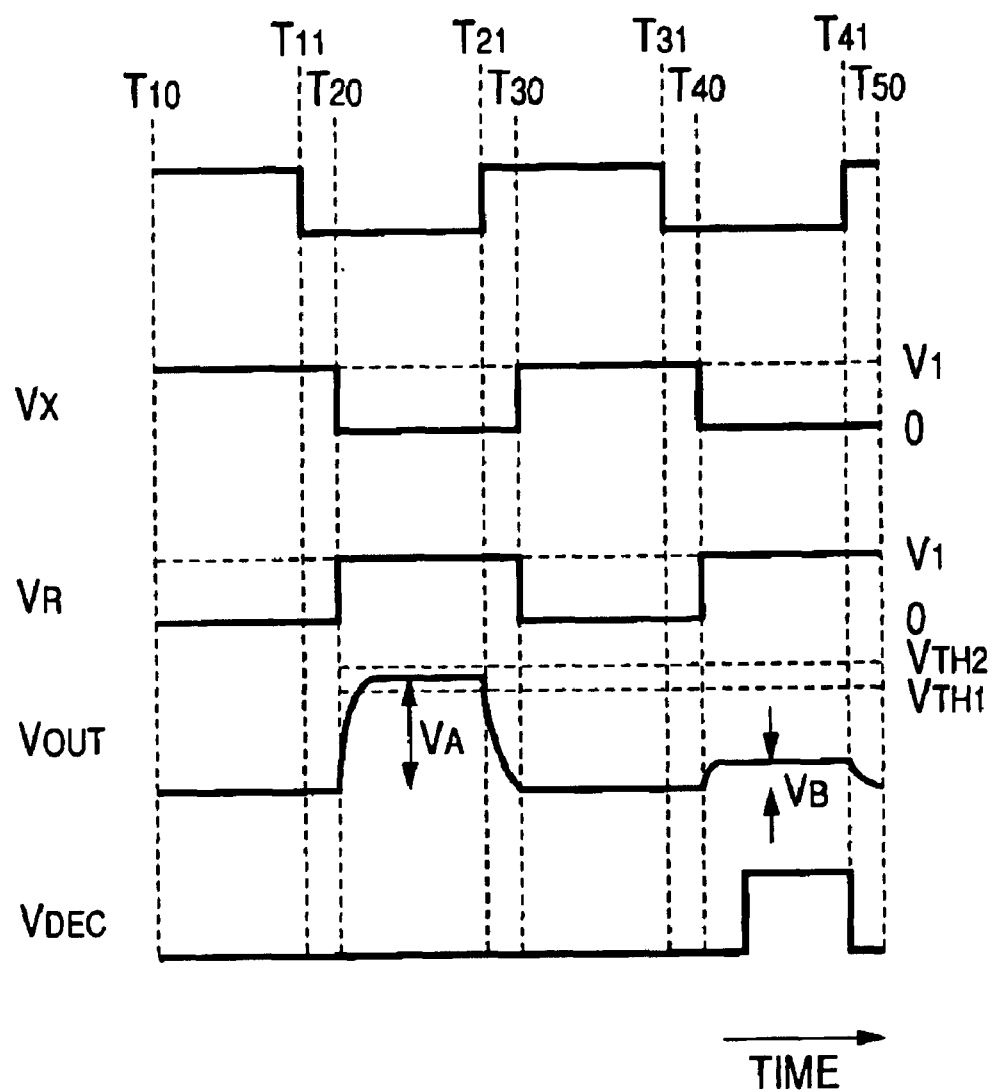
FIG. 3 is a time-domain diagram of voltages and signals in the apparatus of FIG. 2.

The control circuit 110 outputs the detection-purpose voltage VX, the reference voltage VR, and the reset signal. As shown in FIG. 3, the detection-purpose voltage VX is a binary signal or a rectangular-wave pulse signal whose voltage periodically changes between a high level and a low level equal to a prescribed positive level V1 and a 0 level respectively. The reference voltage VR is an inversion of the detection-purpose voltage VX. Thus, the reference voltage VR is equal to the low level when the detection-purpose voltage VX is equal to the high level. The reference voltage VR is equal to the high level when the detection-purpose voltage VX is equal to the low level.

The detection-purpose voltage VX is applied to the selected detection capacitor 121 via the on-state switch 131*a*. The reference voltage VR is applied to the reference capacitor 126. The reset signal is applied to the reset switch 162.

As shown in FIG. 3, at a moment T10, the detection-purpose voltage VX rises to the high level (V1) and the reference voltage VR drops to the low level (0). During the time interval between the moment T10 to a later moment T20, the detection-purpose voltage VX and the reference voltage VR remain equal to the high level (V1) and the low level (0) respectively. Accordingly, the selected detection capacitor 121 is charged while the reference capacitor 126 is discharged. The amount of charges in the selected detection capacitor 121 reaches an extreme level "CX·V1" where CX denotes the capacitance of the selected detection capacitor 121.

During the time interval between the moment T10 and a later moment T11 before the moment T20, the reset signal continues to be in its high-level state so that the reset switch 162 remains in its on state. Thus, the feedback capacitor 141 remains short-circuited. At the moment T11, the reset signal changes to its low-level state so that the feedback capacitor 141 moves out of the short-circuited state. After the moment T11, the reset signal continues to be in its low-level state.

At the moment T20, the detection-purpose voltage VX drops to the low level (0) and the reference voltage VR rises to the high level (V1). During the time interval between the moment T20 and a later moment T30, the detection-purpose voltage VX and the reference voltage VR remain equal to the low level (0) and the high level (V1) respectively. Accordingly, the selected detection capacitor 121 is discharged while the reference capacitor 126 is charged. The amount of charges in the reference capacitor 126 reaches an extreme level "CR·V1" where CR denotes the capacitance of the reference capacitor 126. The charges "CX·V1" move from the upper electrode 121*b* of the selected detection capacitor 121 to the lower electrode 141*a* of the feedback capacitor 141. At the same time, charges "−CR·V1" equal in amount and opposite in sign (polarity) to the charges "CR·V1" in the upper electrode 126*b* of the reference capacitor 126 are moved to the lower electrode 141*a* of the feedback capacitor 141. Thus, the amount of charges in the lower electrode 141*a* of the feedback capacitor 141 reaches an extreme level "(CX−CR)V1". Accordingly, the output voltage VOUT from the operational amplifier 162 reaches an extreme level VA equal to "(CX−CR)V1/CF" where CF denotes the capacitance of the feedback capacitor 141. It is assumed that the level VA is in the normal range between the lower threshold voltage VTH1 and the upper threshold voltage VTH2.

At a moment T21 between the moments T20 and T30, the reset signal changes to its high-level state so that the feedback capacitor 141 is short-circuited. After the moment T21, the reset signal continues to be in its high-level state. Therefore, the feedback capacitor 141 is discharged, and the output voltage VOUT from the operational amplifier 162 drops from the level VA. At the moment T30, the output voltage VOUT reaches 0 volt.

During a limited time range within the time interval between the moments T20 and T21, the decision circuit 170 accepts the output voltage VOUT (VA) from the operational amplifier 162. The decision circuit 170 determines whether or not the accepted output voltage VOUT (VA) is between the lower threshold voltage VTH1 and the upper threshold voltage VTH2. Since the accepted output voltage VOUT (VA) is between the lower threshold voltage VTH1 and the upper threshold voltage VTH2, the decision circuit 170 does not output a high-level fault-indication signal VDEC. This means that the accepted output voltage VOUT is in the normal range. The lower threshold voltage VTH1 and the upper threshold voltage VTH2 are preset to define a reliable normal range for the output voltage VOUT. Specifically, the threshold voltages VTH1 and VTH2 are lower and higher than the normal center voltage VA equal to "(CX−CR)V1/CF" respectively.

As shown in FIG. 3, a stage between the moment T30 and a later moment T50 follows the stage between the moment T10 and the moment T30. Changes of the detection-purpose voltage VX, the reference voltage VR, and the reset signal during the stage between the moments T30 and T50 are similar to those during the stage between the moments T10 and T30.

At a moment T40 between the moments T30 and T50, the detection-purpose voltage VX drops to the low level (0) and the reference voltage VR rises to the high level (V1). During the time interval between the moments T40 and T50, the detection-purpose voltage VX and the reference voltage VR remain equal to the low level (0) and the high level (V1) respectively. Accordingly, the selected detection capacitor 121 is discharged while the reference capacitor 126 is charged. The amount of charges in the reference capacitor 126 reaches an extreme level "CR·V1". The charges "CX·V1" move from the upper electrode 121*b* of the selected detection capacitor 121 to the lower electrode 141*a* of the feedback capacitor 141. At the same time, charges "−CR·V1" equal in amount and opposite in sign (polarity) to the charges "CR·V1" in the upper electrode 126*b* of the reference capacitor 126 are moved to the lower electrode 141*a* of the feedback capacitor 141. Thus, the amount of charges in the lower electrode 141*a* of the feedback capacitor 141 reaches an extreme level "(CX−CR)V1". Accordingly, the output voltage VOUT from the operational amplifier 162 reaches an extreme level VB equal to "(CX−CR)V1/CF". It is assumed that the level VB is outside the normal range between the lower threshold voltage VTH1 and the upper threshold voltage VTH2.

At a moment T41 between the moments T40 and T50, the reset signal changes to its high-level state so that the feedback capacitor 141 is short-circuited. After the moment T41, the reset signal continues to be in its high-level state.

Therefore, the feedback capacitor 141 is discharged, and the output voltage VOUT from the operational amplifier 162 drops from the level VB. At the moment T50, the output voltage VOUT reaches 0 volt.

During a limited time range within the time interval between the moments T40 and T41, the decision circuit 170 accepts the output voltage VOUT (VB) from the operational amplifier 162. The decision circuit 170 determines whether or not the accepted output voltage VOUT (VB) is between the lower threshold voltage VTH1 and the upper threshold voltage VTH2. Since the accepted output voltage VOUT (VB) is not between the lower threshold voltage VTH1 and the upper threshold voltage VTH2, the decision circuit 170 outputs a high-level fault-indication signal VDEC. This means that the accepted output voltage VOUT is outside the normal range, and that the selected detection capacitor 121 fails.

The control circuit 110 receives the high-level fault-indication signal VDEC from the decision circuit 170. The control circuit 110 recognizes from the received high-level fault-indication signal VDEC that the selected detection capacitor 121 fails. Then, in response to the received high-level fault-indication signal VDEC, the control circuit 110 changes the switches 131a and 131b to their off states, and changes the switches 132a and 132b to their on states.

Therefore, the detection capacitor 122 is newly selected among the detection capacitors 121–124 as actually-used one connected with the control circuit 110 and the conversion circuit 140. In other words, the selected detection capacitor is changed from the capacitor 121 to the capacitor 122. The detection capacitors 121, 123, and 124 are disconnected from the control circuit 110 and the conversion circuit 140.

Subsequently, operation steps similar to those in the stage between the moments T10 and T30 or the stage between the moments T30 and T50 are repetitively implemented. In the event that the decision circuit 170 detects that the selected detection capacitor 122 fails, the decision circuit 170 outputs a high-level fault-indication signal VDEC. The control circuit 110 receives the high-level fault-indication signal VDEC. The control circuit 110 recognizes from the received high-level fault-indication signal VDEC that the selected detection capacitor 122 fails. Then, in response to the received high-level fault-indication signal VDEC, the control circuit 110 changes the switches 132a and 132b to their off states, and changes the switches 133a and 133b to their on states. Therefore, the detection capacitor 123 is newly selected among the detection capacitors 121–124 as actually-used one connected with the control circuit 110 and the conversion circuit 140. In other words, the selected detection capacitor is changed from the capacitor 122 to the capacitor 123. The detection capacitors 121, 122, and 124 are disconnected from the control circuit 110 and the conversion circuit 140.

Subsequently, operation steps similar to those in the stage between the moments T10 and T30 or the stage between the moments T30 and T50 are repetitively implemented. In the event that the decision circuit 170 detects that the selected detection capacitor 123 fails, the decision circuit 170 outputs a high-level fault-indication signal VDEC. The control circuit 110 receives the high-level fault-indication signal VDEC. The control circuit 110 recognizes from the received high-level fault-indication signal VDEC that the selected detection capacitor 123 fails. Then, in response to the received high-level fault-indication signal VDEC, the control circuit 110 changes the switches 133a and 133b to their off states, and changes the switches 134a and 134b to their on states. Therefore, the detection capacitor 124 is newly selected among the detection capacitors 121–124 as actually-used one connected with the control circuit 110 and the conversion circuit 140. In other words, the selected detection capacitor is changed from the capacitor 123 to the capacitor 124. The detection capacitors 121–123 are disconnected from the control circuit 110 and the conversion circuit 140.

Accordingly, the apparatus 100 can continue to operate normally until all the detection capacitors 121–124 fail.

As previously mentioned, the program for the control circuit 110 has a diagnosis-related segment. In addition, the program has a segment for the generation of the detection-purpose voltage VX, the reference voltage VR, and the reset signal. The diagnosis-related program segment and the signal-generation program segment are executed on a time sharing basis.

Figure 4:
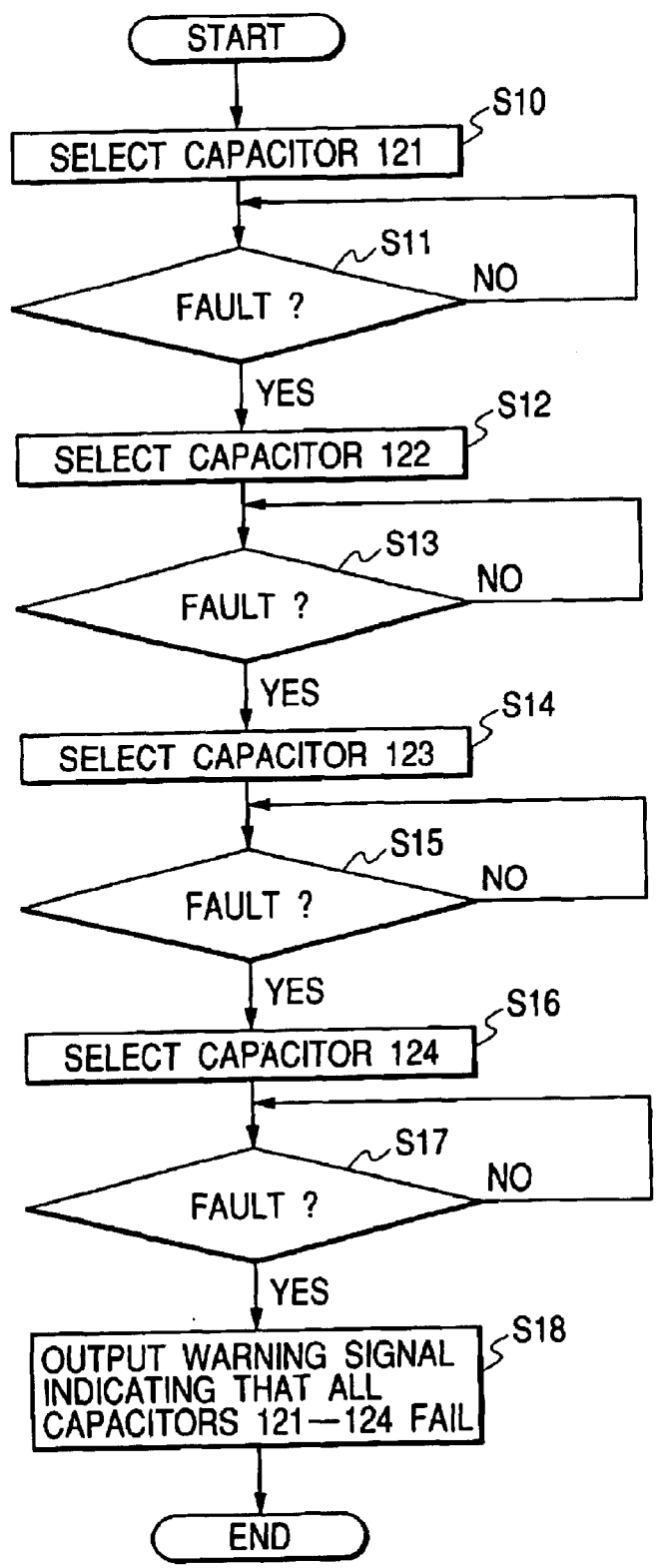
FIG. 4 is a flowchart of a diagnosis-related segment of a program for a control circuit in FIG. 2.

FIG. 4 is a flowchart of the diagnosis-related segment of the program for the control circuit 110. With reference to FIG. 4, a first step S10 of the program segment controls the switches 131a–134a and 131b–134b to select the detection capacitor 121 among the detection capacitors 121–124 as actually-used one. The selected detection capacitor 121 is connected with the control circuit 110 and the conversion circuit 140. The selected detection capacitor 121 is subjected to the detection-purpose voltage VX. After the step S10, the program advances to a step S11.

The step S11 determines whether or not a high-level fault-indication signal VDEC comes from the decision circuit 170. In this case, the high-level fault-indication signal VDEC indicates that the selected detection capacitor 121 fails. When a high-level fault-indication signal VDEC comes, the program advances from the step S11 to a step S12. Otherwise, the step S11 is repeated.

The step S12 controls the switches 131a–134a and 131b–134b to select the detection capacitor 122 among the detection capacitors 121–124 as actually-used one. The selected detection capacitor 122 is connected with the control circuit 110 and the conversion circuit 140. The selected detection capacitor 122 is subjected to the detection-purpose voltage VX. After the step S12, the program advances to a step S13.

The step S13 determines whether or not a high-level fault-indication signal VDEC comes from the decision circuit 170. In this case, the high-level fault-indication signal VDEC indicates that the selected detection capacitor 122 fails. When a high-level fault-indication signal VDEC comes, the program advances from the step S13 to a step S14. Otherwise, the step S13 is repeated.

The step S14 controls the switches 131a–134a and 131b–134b to select the detection capacitor 123 among the detection capacitors 121–124 as actually-used one. The selected detection capacitor 123 is connected with the control circuit 110 and the conversion circuit 140. The selected detection capacitor 123 is subjected to the detection-purpose voltage VX. After the step S14, the program advances to a step S15.

The step S15 determines whether or not a high-level fault-indication signal VDEC comes from the decision circuit 170. In this case, the high-level fault-indication signal VDEC indicates that the selected detection capacitor 123 fails. When a high-level fault-indication signal VDEC comes, the program advances from the step S15 to a step S16. Otherwise, the step S15 is repeated.

The step S16 controls the switches 131a–134a and 131b–134b to select the detection capacitor 124 among the detection capacitors 121–124 as actually-used one. The selected detection capacitor 124 is connected with the control circuit 110 and the conversion circuit 140. The selected detection capacitor 123 is subjected to the detection-purpose voltage VX. After the step S16, the program advances to a step S17.

The step S17 determines whether or not a high-level fault-indication signal VDEC comes from the decision circuit 170. In this case, the high-level fault-indication signal VDEC indicates that the selected detection capacitor 124 fails. When a high-level fault-indication signal VDEC comes, the program advances from the step S17 to a step S18. Otherwise, the step S17 is repeated.

The step S18 outputs a warning signal indicating that all the detection capacitors 121–124 fail. After the step S18, the execution of the program segment ends.

The decision circuit 170 determines whether or not each of the detection capacitors 121–124 fails on the basis of the output voltage VOUT from the operational amplifier 162 which reflects the difference in capacitance between the detection capacitor of interest and the reference capacitor 126. Alternatively, the determination as to whether or not each of the detection capacitors 121–124 fails may be based on one of known capacitor diagnosis technologies.

The determination as to whether or not each of the detection capacitors 121–124 fails may be implemented as follows. In the case where the movable electrodes 121b–124b in the detection capacitors 121–124 are formed on a diaphragm, a prescribed magnitude of a physical quantity such as a pressure is applied to the diaphragm. An amount of deformation of the diaphragm which responds to the applied physical quantity is measured. A decision is made as to whether or not the measured deformation amount is in a prescribed range corresponding to a normal range. When the measured deformation amount is in the prescribed range, it is determined that the detection capacitor of interest is normal. On the other hand, when the measured deformation amount is outside the prescribed range, it is determined that the detection capacitor of interest fails.

Second Embodiment

Figure 5:
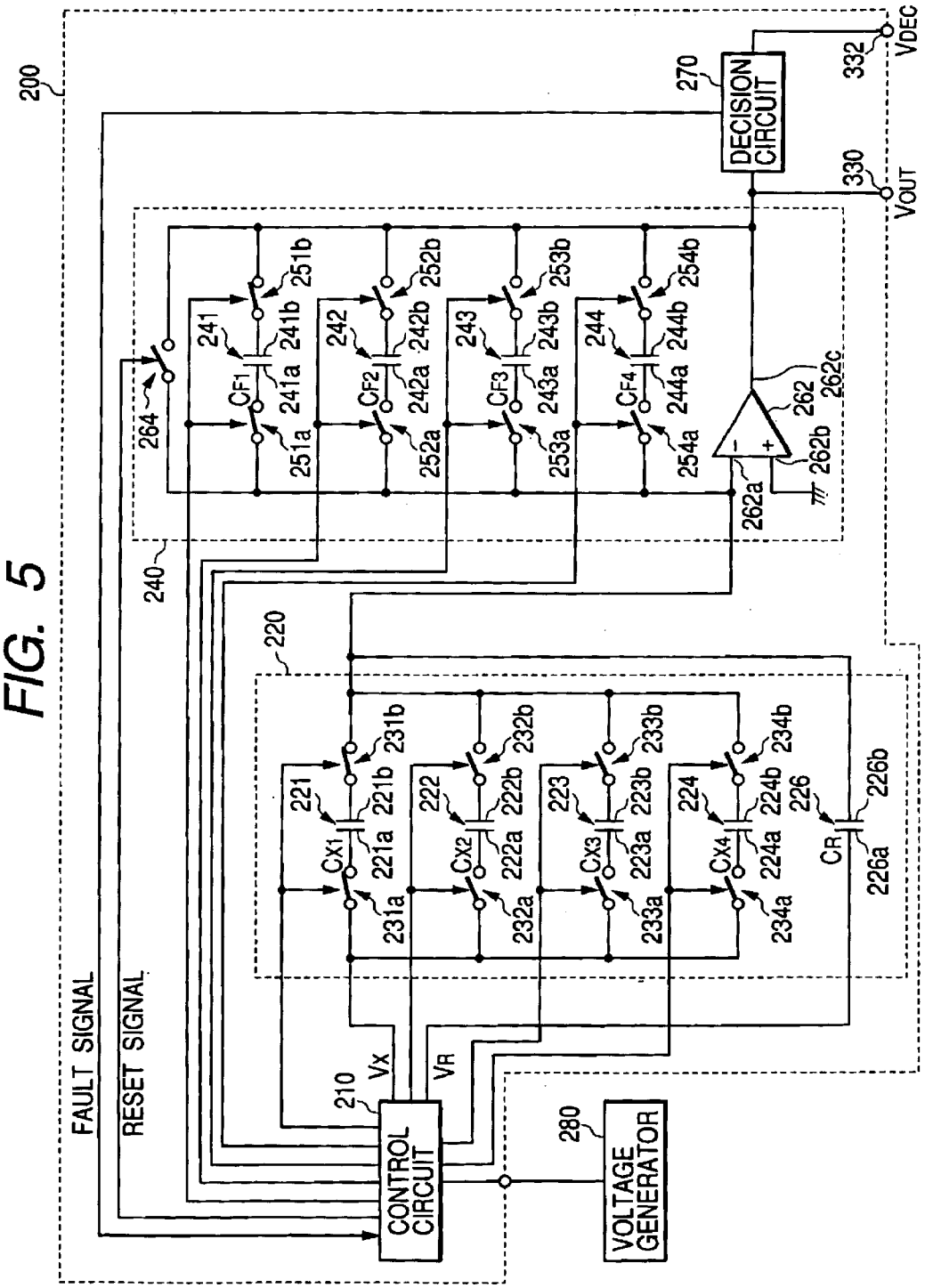
FIG. 5 is a diagram of a capacitive sensor apparatus according to a second embodiment of this invention.

FIG. 5 shows a capacitive sensor apparatus 200 according to a second embodiment of this invention. As shown in FIG. 5, the apparatus 200 includes a control circuit 210, a capacitive sensor 220, a conversion circuit 240, and a decision circuit 270. The control circuit 210 is connected with a voltage generator 280 external with respect to the apparatus 200. The control circuit 210 is supplied with a dc voltage from the voltage generator 280.

The capacitive sensor 220 includes detection capacitors 221, 222, 223, and 224, switches 231a, 232a, 233a, and 234a, switches 231b, 232b, 233b, and 234b, and a reference capacitor 226. The detection capacitors 221–224 have capacitances which depend on a physical quantity to be detected. The dependencies of the capacitances of the detection capacitors 221–224 on the physical quantity are different. The detection capacitors 221, 222, 223, and 224 exhibit capacitance variations $\Delta CX1$, $\Delta CX2$, $\Delta CX3$, and $\Delta CX4$ in response to a prescribed magnitude of the physical quantity, respectively. The capacitance variations $\Delta CX1$, $\Delta CX2$, $\Delta CX3$, and $\Delta CX4$ are in a relation such that $\Delta CX1 = \Delta CX$; $\Delta CX2 = 2 \cdot \Delta CX$; $\Delta CX3 = 3 \cdot \Delta CX$; and $\Delta CX4 = 4 \cdot \Delta CX$. Accordingly, the sensitivity of the detection capacitor 224 with respect to the physical quantity to be detected is equal to four times that of the detection capacitor 221. On the other hand, the detection capacitor 221 provides a measurement range equal to four times that provided by the detection capacitor 224. Examples of the physical quantity are a pressure, an acceleration, and an angular velocity.

The detection capacitor 221 has a pair of a fixed electrode 221a and a movable electrode 221b exposed to the physical quantity to be detected. The capacitance of the detection capacitor 221 depends on the physical quantity.

The detection capacitor 222 has a pair of a fixed electrode 222a and a movable electrode 222b exposed to the physical quantity to be detected. The capacitance of the detection capacitor 222 depends on the physical quantity.

The detection capacitor 223 has a pair of a fixed electrode 223a and a movable electrode 223b exposed to the physical quantity to be detected. The capacitance of the detection capacitor 223 depends on the physical quantity.

The detection capacitor 224 has a pair of a fixed electrode 224a and a movable electrode 224b exposed to the physical quantity to be detected. The capacitance of the detection capacitor 224 depends on the physical quantity.

The reference capacitor 226 has a pair of a lower fixed electrode 226a and an upper fixed electrode 226b opposing each other. Basically, the capacitance of the reference capacitor 226 remains constant independently of the physical quantity to be detected.

The movable electrodes 221b–224b in the detection capacitors 221–224 are designed as upper electrodes while the fixed electrodes 221a–224a therein are designed as lower electrodes opposing the upper electrodes. The lower electrodes 221a–224a in the detection capacitors 221–224 are connected to the control circuit 210 via the switches 231a–234a respectively. The upper electrodes 221b–224b in the detection capacitors 221–224 are connected to the conversion circuit 240 via the switches 231b–234b respectively. The lower electrode 226a in the reference capacitor 226 is directly connected to the control circuit 210. The upper electrode 226b in the reference capacitor 226 is directly connected to the conversion circuit 240.

The control circuit 210 includes a microcomputer or a similar device having a combination of an input/output circuit, a CPU, a ROM, and a RAM. The control circuit 210 operates in accordance with a program stored in the ROM. The program is designed to enable the control circuit 210 to execute operation steps mentioned hereafter.

The control circuit 210 generates a detection-purpose voltage VX and a reference voltage VR on the basis of the dc voltage supplied from the voltage generator 280. The detection-purpose voltage VX and the reference voltage VR are similar to those in the first embodiment of this invention. The detection-purpose voltage VX is applied to one of the lower electrodes 221a–224a in the detection capacitors 221–224 via related one of the switches 231a–234a. The reference voltage VR is applied to the lower electrode 226a in the reference capacitor 226.

The control circuit 210 is connected with the control terminals of the switches 231a–234a and 231b–234b. The control circuit 210 controls the switches 231a–234a and 231b–234b as the control circuit 110 controls the switches 131a–134a and 131b–134b in the first embodiment of this invention. The control of the switches 231a–234a and 231b–234b selects one among the detection capacitors 221–224 as an actually-used detection capacitor subjected to the detection-purpose voltage VX and connected between the control circuit 210 and the conversion circuit 240.

The control circuit 210 is connected with the conversion circuit 240. The control circuit 210 generates a reset signal on the basis of the dc voltage supplied from the voltage generator 280. The reset signal is similar to that in the first embodiment of this invention. The reset signal is transmitted from the control circuit 210 to the conversion circuit 240.

The control circuit 210 is connected with the decision circuit 270. The control circuit 210 can receive a high-level fault-indication signal VDEC from the decision circuit 270. The control circuit 210 changes the switches 231a–234a and 231b–234b in response to the received high-level fault-indication signal VDEC as the control circuit 110 changes the switches 131a–134a and 131b–134b in the first embodiment of this invention.

The conversion circuit 240 includes an operational amplifier 262, a reset switch 264, feedback capacitors 241, 242, 243, and 244, switches 251a, 252a, 253a, and 254a, and switches 251b, 252b, 253b, and 254b.

The upper electrodes 221b–224b in the detection capacitors 221–224 lead to the inverting input terminal 262a of the operational amplifier 262 via the switches 231b–234b respectively. The upper electrode 226b in the reference capacitor 226 is directly connected to the inverting input terminal 262a of the operational amplifier 262. The reset switch 264 is connected between the inverting input terminal 262a of the operational amplifier 262 and the output terminal 262c thereof. The non-inverting input terminal 262b of the operational amplifier 262 is grounded. The non-inverting input terminal 262b of the operational amplifier 262 may be connected to a 0-volt line.

The feedback capacitor 241 has a first electrode 241a and a second electrode 241b opposing each other. The feedback capacitor 242 has a first electrode 242a and a second electrode 242b opposing each other. The feedback capacitor 243 has a first electrode 243a and a second electrode 243b opposing each other. The feedback capacitor 244 has a first electrode 244a and a second electrode 244b opposing each other.

The feedback capacitor 241 has a prescribed capacitance CF1. The feedback capacitor 242 has a prescribed capacitance CF2. The feedback capacitor 243 has a prescribed capacitance CF3. The feedback capacitor 244 has a prescribed capacitance CF4. The capacitances CF1–CF4 of the feedback capacitors 241–244 differ from each other. The capacitances CF1–CF4 are in a relation such that CF1=CF; CF2=2·CF; CF3=3·CF; and CF4=4·CF.

The first electrodes 241a–244a of the feedback capacitors 241–244 are connected to the inverting input terminal 262a of the operational amplifier 262 via the switches 251a–254a respectively. The second electrodes 241b–244b of the feedback capacitors 241–244 are connected to the output terminal 262c of the operational amplifier 262 via the switches 251b–254b respectively.

The switches 251a and 251b have control terminals which are connected in common to the control circuit 210. The switches 52a and 252b have control terminals which are connected in common to the control circuit 210. The switches 253a and 253b have control terminals which are connected in common to the control circuit 210. The switches 254a and 254b have control terminals which are connected in common to the control circuit 210. The switches 251a–254a and 251b–254b are controlled by the control circuit 210. Specifically, each of the switches 251a–254a and 251b–254b is changed between its on state and its off state (its closed state and its open state) by the control circuit 210. In more detail, the control of the switches 251a–254a and 251b–254b by the control circuit 210 is designed so that one will be selected among the feedback capacitors 241–244 as an actually-used feedback capacitor connected between the inverting input terminal 262a of the operational amplifier 262 and the output terminal 262c thereof.

The reset switch 264 has a control terminal connected with the control circuit 210. The control terminal of the reset switch 264 receives the reset signal from the control circuit 210. The reset switch 264 changes to its on state (its closed state) when the reset signal changes to its high-level state. The selected feedback capacitor connected between the the inverting input terminal 262a of the operational amplifier 262 and the output terminal 262c thereof is short-circuited and hence the voltage across the selected feedback capacitor is reset to 0 volt when the reset switch 264 is in its on state. The reset switch 264 falls into its off state when the reset signal changes to its low-level state.

The control circuit 210 sets the switches 251a and 251b in their on states when setting the switches 231a and 231b in their on states. The control circuit 210 sets the switches 252a and 252b in their on states when setting the switches 232a and 232b in their on states. The control circuit 210 sets the switches 253a and 253b in their on states when setting the switches 233a and 233b in their on states. The control circuit 210 sets the switches 254a and 254b in their on states when setting the switches 234a and 234b in their on states.

Thus, the control circuit 210 controls the switches 231a–234a and 231b–234b so that one of the detection capacitors 221–224 will be selected and actually used for the detection of the physical quantity. In addition, the control circuit 210 controls the switches 251a–254a and 251b–254b so that one of the feedback capacitors 241–244 will be selected as actually-used feedback capacitor connected between the inverting input terminal 262a of the operational amplifier 262 and the output terminal 262c thereof. The control of the switches 251a–254a and 251b–254b is linked with the control of the switches 231a–234a and 231b–234b to implement the following synchronous procedures. The feedback capacitor 241 is selected when the detection capacitor 221 is selected. The feedback capacitor 242 is selected when the detection capacitor 222 is selected. The feedback capacitor 243 is selected when the detection capacitor 223 is selected. The feedback capacitor 244 is selected when the detection capacitor 224 is selected.

An electric signal depending on the capacitance of the selected detection capacitor (the actually-used detection capacitor) is propagated to the conversion circuit 240. The operational amplifier 262 in the conversion circuit 240 outputs a voltage VOUT which depends on the capacitance of the selected detection capacitor, and hence which indicates the physical quantity to be detected.

The decision circuit 270 has an input terminal connected with the output terminal 262c of the operational amplifier 262 in the conversion circuit 240. The decision circuit 270 receives the conversion-circuit output voltage VOUT, that is, the output voltage VOUT from the operational amplifier 262. The decision circuit 270 is similar to the decision circuit 170 in the first embodiment of this invention. The decision circuit 270 determines whether or not the conversion-circuit output voltage VOUT is within a normal range (a prescribed range) defined between a lower threshold voltage and an upper threshold voltage. When the conversion-circuit output voltage VOUT is not within the normal range, the decision circuit 270 outputs the high-level fault-indication signal VDEC. When the conversion-circuit output voltage VOUT is within the normal range, the decision circuit 270 does not output the high-level fault-indication signal VDEC. The high-level fault-indication signal VDEC is fed to the control circuit 210.

The apparatus 200 has output terminals 330 and 332 for the conversion-circuit output voltage VOUT and the high-level fault-indication signal VDEC respectively. The apparatus output terminal 330 is connected to the output terminal 262c of the operational amplifier 262 to receive the conversion-circuit output voltage VOUT. The apparatus output terminal 332 is connected to the decision circuit 270 to receive the high-level fault-indication signal VDEC.

The apparatus 200 includes an operation unit, and first and second voltage generators. The first and second voltage generators are connected between the operation unit and the decision circuit 270. The first voltage generator produces the lower threshold voltage which is used by the decision circuit 270. The lower threshold voltage can be adjusted by actuating the operation unit. The second voltage generator produces the upper threshold voltage which is used by the decision circuit 270. The upper threshold voltage can be adjusted by actuating the operation unit.

In the case where the detection capacitor 221 and the feedback capacitor 241 are selected, when the detection capacitor 221 exhibits a capacitance variation $\Delta CX1$ ($=\Delta CX$) in response to a given magnitude of the physical quantity to be detected, the output voltage VOUT from the operational amplifier 261 reaches an extreme level "VX·$\Delta CX1$/CF1" equal to "VX·$\Delta CX$/CF". It should be noted that the capacitance CF1 of the selected feedback capacitor 241 is equal to the value CF.

In the case where the detection capacitor 222 and the feedback capacitor 242 are selected, when the detection capacitor 222 exhibits a capacitance variation $\Delta CX2$ ($=2\cdot\Delta CX$) in response to the given magnitude of the physical quantity to be detected, the output voltage VOUT from the operational amplifier 261 reaches an extreme level "VX·$\Delta CX2$/CF2" equal to "VX·$\Delta CX$/CF". It should be noted that the capacitance CF2 of the selected feedback capacitor 242 is equal to the value 2·CF.

In the case where the detection capacitor 223 and the feedback capacitor 243 are selected, when the detection capacitor 223 exhibits a capacitance variation $\Delta CX3$ ($=3\cdot\Delta CX$) in response to the given magnitude of the physical quantity to be detected, the output voltage VOUT from the operational amplifier 261 reaches an extreme level "VX·$\Delta CX3$/CF3" equal to "VX·$\Delta CX$/CF". It should be noted that the capacitance CF3 of the selected feedback capacitor 243 is equal to the value 3·CF.

In the case where the detection capacitor 224 and the feedback capacitor 244 are selected, when the detection capacitor 224 exhibits a capacitance variation $\Delta CX4$ ($=4\cdot\Delta CX$) in response to the given magnitude of the physical quantity to be detected, the output voltage VOUT from the operational amplifier 261 reaches an extreme level "VX·$\Delta CX4$/CF4" equal to "VX·$\Delta CX$/CF". It should be noted that the capacitance CF4 of the selected feedback capacitor 244 is equal to the value 3·CF.

Accordingly, the output voltage VOUT from the operational amplifier 261 is independent of which of the detection capacitors 221–224 and the feedback capacitors 241–244 are selected.

As previously mentioned, the apparatus 200 includes the operation unit. The control circuit 210 is connected with the operation unit. The control circuit 210 can decide which of the detection capacitors 221–224 and the feedback capacitors 241–244 should be selected according to actuation of the control unit. Thus, an actually-used detection capacitor and an actually-used feedback capacitor can be arbitrarily selected from the detection capacitors 221–224 and the feedback capacitors 241–244 in accordance with actuation of the control unit. When the detection capacitor 221 and the feedback capacitor 241 are selected, a wide detectable range for the physical quantity is available although a detection resolution is relatively low. When the detection capacitor 224 and the feedback capacitor 244 are selected, a high detection resolution is available although a detectable range is relatively narrow.

Diagnosis-related operation of the apparatus 200 is as follows. The control circuit 210 outputs the detection-purpose voltage VX, the reference voltage VR, and the reset signal. The reference voltage VR is applied to the reference capacitor 226. The reset signal is fed to the conversion circuit 240. Initially, the control circuit 210 controls the switches 231a–234a and 231b–234b to select the detection capacitor 221 among the detection capacitors 221–224 as actually-used one. The selected detection capacitor 221 is connected with the control circuit 210 and the conversion circuit 240. The selected detection capacitor 221 is subjected to the detection-purpose voltage VX. In addition, the control circuit 210 controls the switches 251a–254a and 251b–254b to select the feedback capacitor 241 among the feedback capacitors 241–244 as actually-used one. The selected feedback capacitor 241 is connected between the inverting input terminal 262a of the operational amplifier 262 and the output terminal 262c thereof. The control unit 210 determines whether or not a high-level fault-indication signal VDEC comes from the decision circuit 270. In this case, the high-level fault-indication signal VDEC indicates that the selected detection capacitor 221 fails.

When a high-level fault-indication signal VDEC comes, the control circuit 210 controls the switches 231a–234a and 231b–234b to select the detection capacitor 222 among the detection capacitors 221–224 as actually-used one. The selected detection capacitor 222 is connected with the control circuit 210 and the conversion circuit 240. The selected detection capacitor 222 is subjected to the detection-purpose voltage VX. In addition, the control circuit 210 controls the switches 251a–254a and 251b–254b to select the feedback capacitor 242 among the feedback capacitors 241–244 as actually-used one. The selected feedback capacitor 242 is connected between the inverting input terminal 262a of the operational amplifier 262 and the output terminal 262c thereof. The control unit 210 determines whether or not a high-level fault-indication signal VDEC comes from the decision circuit 270. In this case, the high-level fault-indication signal VDEC indicates that the selected detection capacitor 222 fails.

When a high-level fault-indication signal VDEC comes, the control circuit 210 controls the switches 231a–234a and 231b–234b to select the detection capacitor 223 among the detection capacitors 221–224 as actually-used one. The selected detection capacitor 223 is connected with the control circuit 210 and the conversion circuit 240. The selected detection capacitor 223 is subjected to the detection-purpose voltage VX. In addition, the control circuit 210 controls the switches 251a–254a and 251b–254b to select the feedback capacitor 243 among the feedback capacitors 241–244 as actually-used one. The selected feedback capacitor 243 is connected between the inverting input terminal 262a of the operational amplifier 262 and the output terminal 262c thereof. The control unit 210 determines whether or not a high-level fault-indication signal VDEC comes from the decision circuit 270. In this case, the high-level fault-indication signal VDEC indicates that the selected detection capacitor 223 fails.

When a high-level fault-indication signal VDEC comes, the control circuit 210 controls the switches 231a–234a and 231b–234b to select the detection capacitor 224 among the detection capacitors 221–224 as actually-used one. The selected detection capacitor 224 is connected with the control circuit 210 and the conversion circuit 240. The selected detection capacitor 224 is subjected to the detection-purpose voltage VX. In addition, the control circuit 210 controls the switches 251a–254a and 251b–254b to select the feedback capacitor 244 among the feedback capacitors 241–244 as actually-used one. The selected feedback capacitor 244 is connected between the inverting input terminal 262a of the operational amplifier 262 and the output terminal 262c thereof.

Third Embodiment

Figure 6:
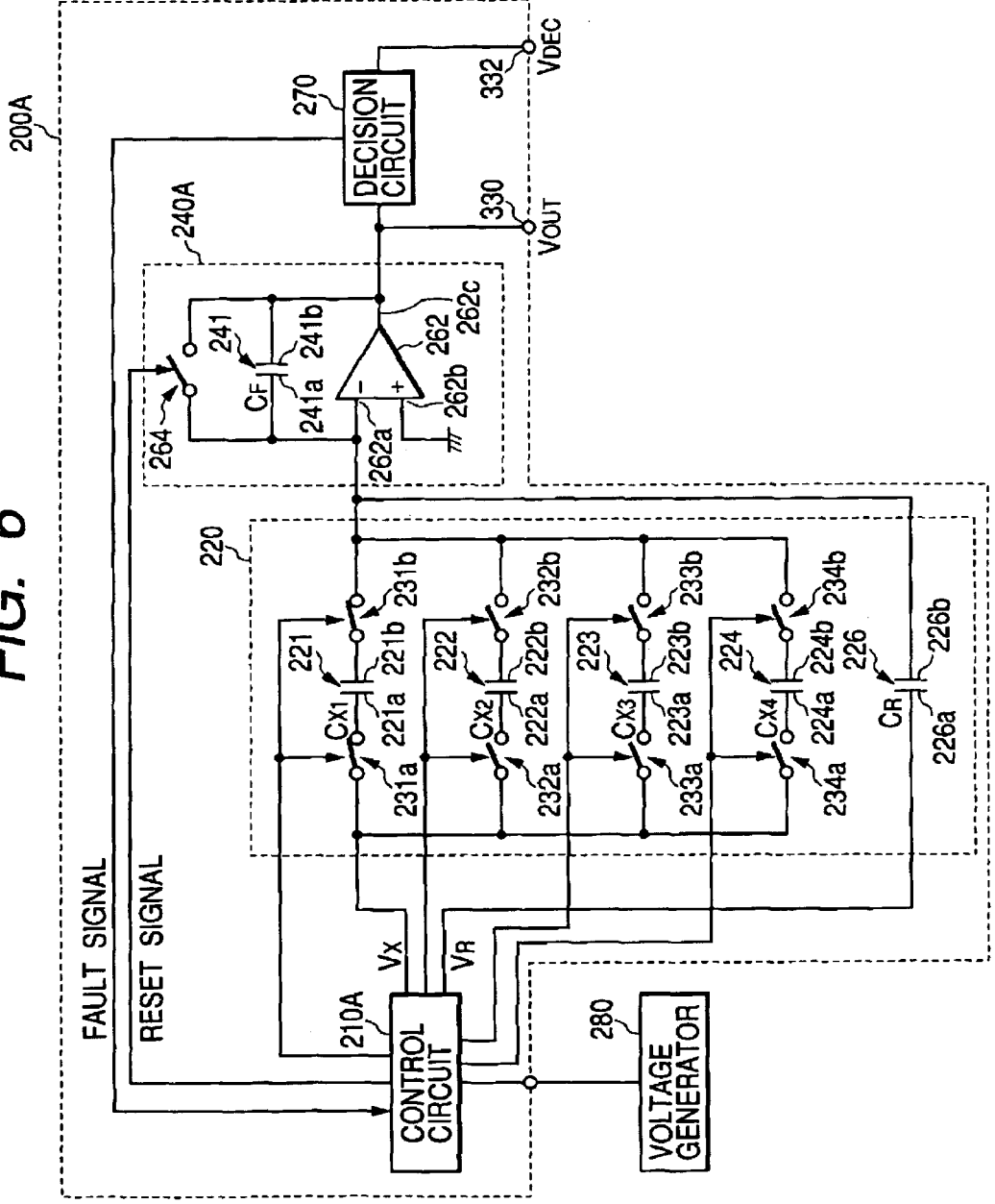
FIG. 6 is a diagram of a capacitive sensor apparatus according to a third embodiment of this invention.

FIG. 6 shows a capacitive sensor apparatus 200A according to a third embodiment of this invention. The apparatus 200A is similar to the apparatus 200 in FIG. 5 except for design changes mentioned hereafter.

As shown in FIG. 6, the apparatus 200A includes a control circuit 210A and a conversion circuit 240A instead of the control circuit 210 and the conversion circuit 240 (see FIG. 5) respectively. The conversion circuit 240A includes a feedback capacitor 241 and a reset switch 264 connected between the inverting input terminal of the operational amplifier 262 and the output terminal 262c thereof. The feedback capacitor 241 has a prescribed capacitance CF.

When the detection capacitor 221 is selected among the detection capacitors 221–224 as actually-used one, the control circuit 210A sets the detection-purpose voltage VX equal to a predetermined voltage V1. When the detection capacitor 222 is selected among the detection capacitors 221–224 as actually-used one, the control circuit 210A sets the detection-purpose voltage VX equal to the predetermined voltage V1 divided by two (V1/2). When the detection capacitor 223 is selected among the detection capacitors 221–224 as actually-used one, the control circuit 210A sets the detection-purpose voltage VX equal to the predetermined voltage V1 divided by three (V1/3). When the detection capacitor 224 is selected among the detection capacitors 221–224 as actually-used one, the control circuit 210A sets the detection-purpose voltage VX equal to the predetermined voltage V1 divided by four (V1/4).

An extreme level reached by the output voltage VOUT from the operational amplifier 261 is equal to "V1·ΔCX/CF" independent of which of the detection capacitors 221–224 is selected.

Fourth Embodiment

A fourth embodiment of this invention is similar to one of the first to third embodiments thereof except for design changes mentioned hereafter.

In the fourth embodiment of this invention, at least two are simultaneously selected among the detection capacitors as actually-used detection capacitors connected between the control circuit and the conversion circuit. In the case where a plurality of feedback capacitors exists, at least two may be selected among the feedback capacitors as actually-used feedback capacitors connected between the inverting input terminal of the operational amplifier and the output terminal thereof.

Fifth Embodiment

Figure 7:
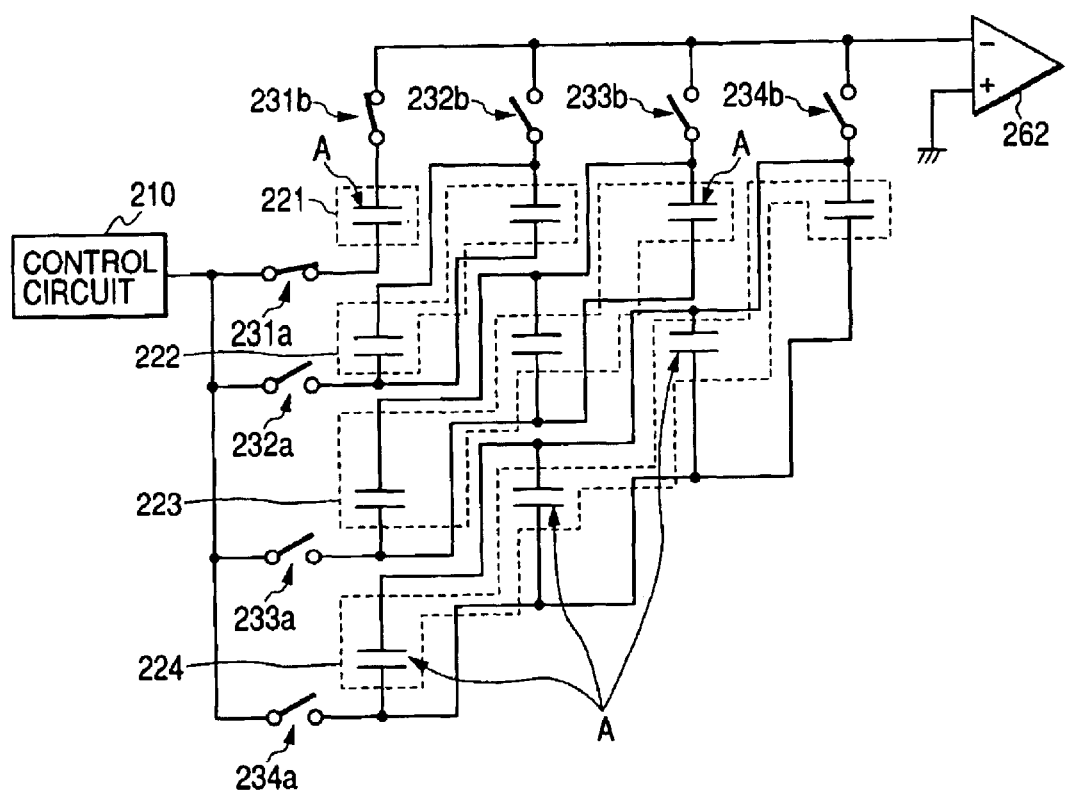
FIG. 7 is a diagram of a portion of a capacitive sensor apparatus according to a fifth embodiment of this invention.

FIG. 7 shows a portion of a capacitive sensor apparatus according to a fifth embodiment of this invention. The apparatus in FIG. 7 is similar to the apparatus 200 in FIG. 5 except for design changes mentioned hereafter.

The apparatus in FIG. 7 includes an array of unit capacitors "A" equal in structure. The unit capacitors "A" are responsive to a physical quantity to be detected. The responses of the unit capacitors "A" to the physical quantity are equal.

One unit capacitor "A" forms the detection capacitor 221. Two unit capacitors "A" connected in parallel compose the detection capacitor 222. Three unit capacitors "A" connected in parallel compose the detection capacitor 223. Four unit capacitors "A" connected in parallel compose the detection capacitor 224.

Sixth Embodiment

Figure 8:
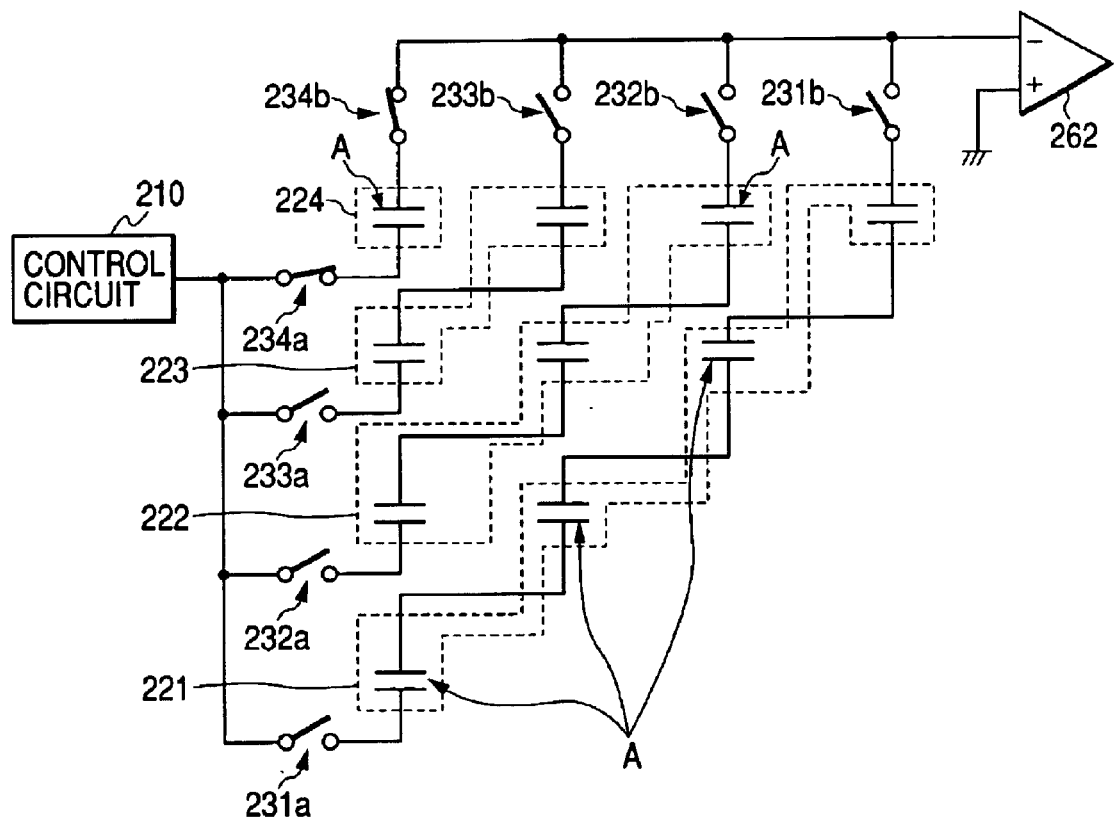
FIG. 8 is a diagram of a portion of a capacitive sensor apparatus according to a sixth embodiment of this invention.

FIG. 8 shows a portion of a capacitive sensor apparatus according to a sixth embodiment of this invention. The apparatus in FIG. 8 is similar to the apparatus 200 in FIG. 5 except for design changes mentioned hereafter.

The apparatus in FIG. 8 includes an array of unit capacitors "A" equal in structure. The unit capacitors "A" are responsive to a physical quantity to be detected. The responses of the unit capacitors "A" to the physical quantity are equal.

One unit capacitor "A" forms the detection capacitor 224. Two unit capacitors "A" connected in series (cascade) compose the detection capacitor 223. Three unit capacitors "A" connected in series compose the detection capacitor 222. Four unit capacitors "A" connected in series compose the detection capacitor 221.

What is claimed is:

1. A capacitive sensor apparatus comprising:
   a capacitive sensor including a plurality of physical-quantity-detection capacitors each having a movable electrode and a fixed electrode;
   a conversion device for converting an output signal of the capacitive sensor into an apparatus output signal;
   first means for selectively connecting and disconnecting each of the plurality of physical-quantity-detection capacitors to and from the conversion device;
   second means for determining whether or not each of the plurality of physical-quantity-detection capacitors fails in response to the capacitive sensor output signal; and
   third means for, when the second means determines that a first one of the plurality of physical-quantity-detection capacitors fails, disconnecting the first one from the conversion device and connecting a second one of the plurality of physical-quantity-detection capacitors to the conversion device,
   wherein the conversion device includes means for changing a characteristic of the conversion of the output signal of the capacitive sensor into the apparatus output signal in accordance with which one of the plurality of physical-quantity-detection capacitors is connected to the conversion device to make the apparatus output signal independent of which one of the plurality of the physical-quantity-detection capacitors is connected to the conversion device.

2. A capacitive sensor apparatus as recited in claim 1, wherein the means in the conversion device changes a gain of the conversion of the output signal of the capacitive sensor into the apparatus output signal in accordance with which of the physical-quantity-detection capacitors is connected to the conversion device.

3. A capacitive sensor apparatus as recited in claim 1, wherein the movable electrode of each of the plurality of physical-quantity-detection capacitors is formed on a portion of one of a diaphragm, a plurality of diaphragms, a mass, and a plurality of masses.

4. A capacitive sensor apparatus as recited in claim 3, wherein one of the plurality of physical-quantity-detection capacitors fails when an amount of deformation of the diaphragm is outside a prescribed range.

5. A capacitive sensor apparatus as recited in claim 1, wherein the conversion device further comprises at least one feedback capacitor having an upper electrode and a lower electrode and being selected in accordance with the one of the plurality of physical-quantity-detection capacitors connected to the conversion device independent of the apparatus output signal.

6. A capacitive sensor apparatus comprising:
   a capacitive sensor including a plurality of physical-quantity-detection capacitors each having a movable electrode and a fixed electrode;
   a conversion device for converting an output signal of the capacitive sensor into an apparatus output signal:
   first means for selectively connecting and disconnecting each of the plurality of physical-quantity-detection capacitors to and from the conversion device;
   second means for determining whether or not each of the plurality of physical-quantity-detection capacitors fails in response to the capacitive sensor output signal;
   third means for, when the second means determines that a first one of the plurality of physical-quantity-detection capacitors fails, disconnecting the first one from the conversion device and connecting a second one of the plurality of physical-quantity-detection capacitors to the conversion device;
   fourth means for applying a detection-purpose voltage to the capacitive sensor; and
   fifth means for changing the applied detection-purpose voltage in accordance with which one of the plurality of physical-quantity-detection capacitors is connected to the conversion device to make the apparatus output signal independent of which one of the plurality of the physical-quantity-detection capacitors is connected to the conversion device.

7. A capacitive sensor apparatus as recited in claim 6, wherein the conversion device further comprises at least one feedback capacitor having an upper electrode and a lower electrode and being selected in accordance with the one of the plurality of physical-quantity-detection capacitors connected to the conversion device independent of the apparatus output signal.

8. A capacitive sensor apparatus comprising:
   first and second capacitors having capacitances depending on a physical quantity to be detected;
   first means for detecting the physical quantity in response to the capacitance of the first capacitor;
   second means for determining whether or not the first capacitor fails;
   third means for, in cases where the second means determines that the first capacitor fails, detecting the physical quantity in response to the capacitance of the second capacitor;
   fourth means for applying a detection-purpose voltage to the first and second capacitors; and
   fifth means for changing the applied detection-purpose voltage in accordance with which one of the first and second capacitors is used to detect the physical quantity to make a signal value of the detected physical quantity independent of which one of the first and second capacitors is used to detect the physical quantity.

9. A capacitive sensor apparatus as recited in claim 8, wherein the conversion device further comprises at least one feedback capacitor having an upper electrode and a lower electrode and being selected in accordance with the one of the plurality of physical-quantity-detection capacitors connected to the conversion device independent of the apparatus output signal.

10. A capacitive sensor apparatus, comprising:
    a capacitive sensor including a plurality of physical-quantity-detection capacitors each having a movable electrode and a fixed electrode;
    a conversion circuit for converting an output signal of the capacitive sensor into an apparatus output signal;
    a control circuit for selectively connecting and disconnecting each of the plurality of physical-quantity-detection capacitors to and from the conversion device; and
    a decision circuit for determining whether or not each of the plurality of physical-quantity-detection capacitors fails in response to the capacitive sensor output signal,
    wherein the control circuit is for, when the decision circuit determines that a first one of the plurality of physical-quantity-detection capacitors fails, disconnecting the first one of the plurality of physical-quantity-detection capacitors from the conversion circuit and connecting a second one of the plurality of physical-quantity-detection capacitors to the conversion circuit, and
    the conversion circuit further is for changing a characteristic of the conversion of the output signal of the capacitive sensor into the apparatus output signal in accordance with which one of the plurality of physical-quantity-detection capacitors is connected thereto to make the apparatus output signal independent of which one of the plurality of the physical-quantity-detection capacitors is connected to the conversion circuit.

* * * * *